United States Patent
Sakai et al.

(10) Patent No.: US 12,466,935 B2
(45) Date of Patent: *Nov. 11, 2025

(54) FLAME-RETARDANT POLYIMIDE SHAPING MATERIAL AND SHAPED BODY

(71) Applicant: MITSUBISHI GAS CHEMICAL COMPANY, INC., Chiyoda-ku (JP)

(72) Inventors: Atsushi Sakai, Kanagawa (JP); Yuuki Sato, Kanagawa (JP)

(73) Assignee: MITSUBISHI GAS CHEMICAL COMPANY, INC., Chiyoda-ku (JP)

( * ) Notice: Subject to any disclaimer, the term of this patent is extended or adjusted under 35 U.S.C. 154(b) by 854 days.

This patent is subject to a terminal disclaimer.

(21) Appl. No.: 17/633,140

(22) PCT Filed: Jun. 22, 2020

(86) PCT No.: PCT/JP2020/024310
§ 371 (c)(1),
(2) Date: Feb. 4, 2022

(87) PCT Pub. No.: WO2021/024624
PCT Pub. Date: Feb. 11, 2021

(65) Prior Publication Data
US 2022/0332916 A1 Oct. 20, 2022

(30) Foreign Application Priority Data
Aug. 8, 2019 (JP) .................................. 2019-146610

(51) Int. Cl.
| | | |
|---|---|---|
| *C08K 3/04* | (2006.01) | |
| *C08G 73/10* | (2006.01) | |
| *C08K 7/06* | (2006.01) | |
| *C08L 79/08* | (2006.01) | |

(52) U.S. Cl.
CPC ............ *C08K 3/04* (2013.01); *C08G 73/1075* (2013.01); *C08K 7/06* (2013.01); *C08L 79/08* (2013.01); *C08L 2201/02* (2013.01)

(58) Field of Classification Search
CPC ........... C08L 79/08; C08L 27/12; C08K 3/04; C08K 7/06
See application file for complete search history.

(56) References Cited

U.S. PATENT DOCUMENTS

| | | | |
|---|---|---|---|
| 4,384,071 | A | 5/1983 | Nimry et al. |
| 4,532,054 | A | 7/1985 | Johnson |
| 2016/0177062 | A1 | 6/2016 | Sato et al. |
| 2016/0233513 | A1 | 8/2016 | Abe et al. |
| 2017/0275425 | A1 | 9/2017 | Sato |

FOREIGN PATENT DOCUMENTS

| | | |
|---|---|---|
| EP | 1 852 751 A1 | 11/2007 |
| JP | 52-105959 A | 9/1977 |
| JP | 59-226056 A | 12/1984 |
| JP | 1-158069 A | 6/1989 |
| JP | 8-81629 A | 3/1996 |
| JP | 2981301 B2 | 11/1999 |
| JP | 2005-28524 A | 2/2005 |
| JP | 2006-22205 A | 1/2006 |
| JP | 2007-66743 A | 3/2007 |
| JP | 2014-526583 A | 10/2014 |
| JP | 6037088 B1 | 11/2016 |
| KR | 10-2016-0063715 A | 6/2016 |
| RU | 2 028 337 C1 | 2/1995 |
| WO | WO 2013/118704 A1 | 8/2013 |
| WO | WO 2015/020020 A1 | 2/2015 |
| WO | WO 2016/147996 A1 | 9/2016 |
| WO | WO 2016/147997 A1 | 9/2016 |

OTHER PUBLICATIONS

International Search Report mailed on Sep. 15, 2020 in PCT/JP2020/024310 filed on Jun. 22, 2020, 2 pages.

*Primary Examiner* — Catherine S Branch
*Assistant Examiner* — Olga Lucia Donahue
(74) *Attorney, Agent, or Firm* — Oblon, McClelland, Maier & Neustadt, L.L.P.

(57) ABSTRACT

A flame-retardant polyimide molding material containing a semi-aromatic polyimide resin (A) and further containing 15 to 80 mass % of either of the following component (B1) or component (B2): (B1) graphite (B2) a combination of two or more selected from the group consisting of graphite, a fluorine resin, and carbon fiber; and a molded article including the same.

13 Claims, No Drawings

FLAME-RETARDANT POLYIMIDE SHAPING MATERIAL AND SHAPED BODY

CROSS-REFERENCE TO RELATED APPLICATIONS

The present application is a 35 U.S.C. § 371 national stage application of International patent application PCT/JP2020/024310, filed Jun. 22, 2020, which is based on and claims the benefit of priority to Japanese Application No. 2019-146610, filed Aug. 8, 2019. The entire contents of these applications are incorporated herein by reference.

TECHNICAL FIELD

The present invention relates to a flame-retardant polyimide molding material and a molded article.

BACKGROUND ART

A polyimide resin is a useful engineering plastic that has high thermal stability, high strength and high solvent resistance due to rigidity, resonance stabilization and firm chemical bond of the molecular chain thereof, and is being applied to a wide range of fields. A polyimide resin having crystallinity is further enhanced in the heat resistance, the strength and the chemical resistance thereof, and thus is expected for applications as alternatives of metals or the like. While a polyimide resin has high heat resistance, however, it has the problems of exhibiting no thermoplasticity and having low molding process ability.

Vespel (registered trademark), a highly heat-resistant resin, is known as a polyimide molding material (PTL 1). This resin is difficult to process by molding due to its very low flowability even at a high temperature, and is also disadvantageous in terms of cost because it requires molding under conditions of a high temperature and a high pressure for a prolonged period of time. In contrast to this, a resin having a melting point and flowability at a high temperature, such as a crystalline resin, may be processed by molding easily and inexpensively.

Thus, a polyimide resin having thermoplasticity has been reported in recent years. Such a thermoplastic polyimide resin is excellent in molding processability in addition to the original heat resistance of the polyimide resin. The thermoplastic polyimide resin is therefore applicable to a molded article for use in an inhospitable environment to which nylon or polyester, a general purpose thermoplastic resin, is inapplicable.

As the thermoplastic polyimide resin, there are known so-called semi-aromatic polyimide resins, which are obtained by a reaction between an aromatic tetracarboxylic acid component and an aliphatic diamine component or a reaction between an aliphatic tetracarboxylic acid component and an aromatic diamine component (e.g., see PTLs 2 and 3).

In order to impart flame resistance to thermoplastic polyimide resins, addition of a flame retardant has been contemplated. For example, PTL 4 discloses an adhesive film in which an adhesive layer containing a thermoplastic polyimide and a flame retardant is provided on at least one surface of an insulating film.

PTLs 5 and 6 mention that a polyimide resin containing a predetermined repeating unit may be mixed with an additive such as a flame retardant to obtain a resin composition.

CITATION LIST

Patent Literature

PTL 1: JP-A-2005-28524
PTL 2: WO 2013/118704
PTL 3: JP-A-2014-526583
PTL 4: JP-A-2006-22205
PTL 5: WO 2016/147996
PTL 6: WO 2016/147997

SUMMARY OF INVENTION

Technical Problem

Semi-aromatic polyimide resins, however, tend to be inferior in flame resistance to all-aromatic polyimide resins, which are obtained by a reaction between an aromatic tetracarboxylic acid component and an aromatic diamine component. Only mixing a flame retardant and the like to such a semi-aromatic polyimide resin may cause the resin to have difficulty in exhibiting high flame resistance.

An object of the present invention is to provide a polyimide molding material and a molded article that have good molding processability and may exhibit high flame resistance.

Solution to Problem

The present inventors have found that a polyimide molding material containing a semi-aromatic polyimide resin and a specific amount of a specific filler or resin can solve the above problem.

That is, the present invention relates to: a flame-retardant polyimide molding material containing a semi-aromatic polyimide resin (A) and further containing 15 to 80 mass % of either of the following component (B1) or component (B2):
(B1) graphite
(B2) a combination of two or more selected from the group consisting of graphite, a fluorine resin, and carbon fiber; and a molded article including the molding material.

Advantageous Effects of Invention

The flame-retardant polyimide molding material of the present invention is excellent in molding processability as well as can be produced into a molded article having high flame resistance. The molded article can be applied, for example, in various industrial members including industrial machines such as vacuum pumps, communication devices, household electrical products, automobiles, railways, and aviation vehicles, and enclosures for electronic devices such as smartphones, tablet terminals, and personal computers, and additionally, gears, bearings, screws, nuts, packings, tubes, IC sockets for inspection, belts, covering materials for electrical wire, cover-lay films, enclosures for fishing rods and reels, stationery, carbon UD tape, and electronic cigarettes.

DESCRIPTION OF EMBODIMENTS

[Flame-Retardant Polyimide Molding Material]
The flame-retardant polyimide molding material of the present invention contains the semi-aromatic polyimide resin (A) and further contains 15 to 80 mass % of either of the following component (B1) or component (B2):

(B1) graphite
(B2) a combination of two or more selected from the group consisting of graphite, a fluorine resin, and carbon fiber.

The flame-retardant polyimide molding material of the present invention exhibits thermoplasticity and relatively high heat resistance to be a material excellent in molding processability because of containing the semi-aromatic polyimide resin (A). Combining the semi-aromatic polyimide resin (A) and a specific amount of the component (B1) or component (B2) can provide a polyimide molding material and a molded article having high flame resistance.

While the reason why the above effects are obtained in the flame-retardant polyimide molding material of the present invention has not been clarified, the following may be considered.

A combustion mechanism of a resin material is generally as follows. First, a combustible gas in a combustion atmosphere (gas phase) burns to emit a radiation heat, which raises the temperature of the resin material surface. Next, the temperature of the entire resin material increases due to thermal conduction, and pyrolysis of the resin material, which is organic matter, occurs to generate a combustible gas. The generated combustible gas is diffused from the inside of the resin material to the surface (solid phase), then to the gas phase, where the gas combines with oxygen, and the combustion is continued.

An example of a mechanism of flame-retarding the resin material is a method of forming a carbide film (char) on the material surface in the combustion process. When the carbide film is formed on the material surface, the carbide film serves as a combustion barrier layer. This barrier layer interrupts diffusion of the combustible gas generated by pyrolysis of the resin material in the combustion process and ingress of oxygen in the gas phase to achieve flame resistance. This flame-retarding mechanism is accomplished generally by addition of a flame retardant, for example.

A polyimide resin is known to achieve relatively high flame resistance even if the resin is used singly. Its flame retarding mechanism is considered as follows.

In the combustion process of the polyimide resin, a radical cleavage reaction of an imide ring in the polyimide resin occurs around 500 to 650° C., and a radical intermediate is formed along with generation of CO and $CO_2$. It is considered that, in the radical intermediate formed at this stage, the imide ring of the polyimide resin is cleaved but the main chain portion is not cut and maintains a polymer chain state. Subsequently, a C—C bond forming reaction between the radical intermediates proceeds to thereby form a carbon precursor having a high molecular weight.

The carbon precursor formed of the semi-aromatic polyimide resin (A) used in the present invention contains an aromatic ring. Thus, it is considered that the carbon precursor is likely to have a graphite structure and to be converted to a carbide film (char) in the combustion process. Further, graphite and carbon fiber to be used in the component (B1) or (B2) have a high thermal conductivity. It is thus presumed in the present invention that mixing a specific amount of the component (B1) or (B2) to the semi-aromatic polyimide resin (A) improves the flame resistance due to a heat dissipation effect. It is also presumed that an interaction between the semi-aromatic polyimide resin (A) and graphite or carbon fiber having a high thermal conductivity allows formation of a carbide film to progress efficiently and this progress also allows high flame resistance to exhibit.

A fluorine resin to be used in the component (B2) is a material that exhibits a high oxygen index, also having an excellent anti-dripping effect on resin combustion. According to the investigation of the present inventors, however, the inventors have found that, even if a fluorine resin is singly mixed to the semi-aromatic polyimide resin (A), a polyimide molding material to be provided has a small effect of improving the flame resistance and that a combination of a fluorine resin with graphite or carbon fiber can achieve high flame resistance and also provide good mechanical properties.

<Semi-Aromatic Polyimide Resin (A)>

Examples of the semi-aromatic polyimide resin (A) used in the present invention (hereinafter, simply also referred to as the "component (A)") include polyimide resins primarily containing a repeating structural unit derived from an aromatic tetracarboxylic acid component and an aliphatic diamine component and polyimide resins primarily containing a repeating structural unit derived from an aliphatic tetracarboxylic acid component and an aromatic diamine component. The phrase "primarily containing" referred to herein means that containing preferably 50 to 100 mol %, more preferably 75 to 100 mol %, further preferably 80 to 100 mol %, and still further preferably 85 to 100 mol % based on the total repeating structural units derived from the tetracarboxylic acid component and the diamine component constituting the main chain of the polyimide resin.

The component (A) used in the present invention is a thermoplastic resin, which is preferably in a powder or pellet form. The thermoplastic semi-aromatic polyimide resin is distinguished from, for example, polyimide resins formed by closing the imide ring after shaping in a state of a polyimide precursor such as a polyamic acid and having no glass transition temperature (Tg), or polyimide resins that decompose at a temperature lower than the glass transition temperature.

As the component (A) used in present invention, a semi-aromatic polyimide resin primarily containing a repeating structural unit derived from an aromatic tetracarboxylic acid component and an aliphatic diamine component is preferred, from the viewpoint of heat resistance and molding processability. More preferred is a polyimide resin (A1) containing a repeating structural unit represented by the following formula (1) and a repeating structural unit represented by the following formula (2) and having a content ratio of the repeating structural unit of the formula (1) with respect to the total of the repeating structural unit of the formula (1) and the repeating structural unit of the formula (2) of 20 to 70 mol %:

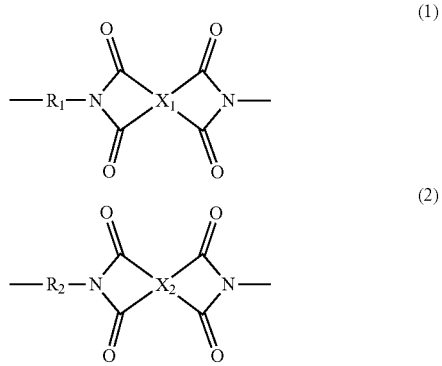

wherein $R_1$ represents a divalent aliphatic group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent aromatic group having from 6 to 22 carbon atoms.

Hereinafter, the semi-aromatic polyimide resin is also simply referred to as the "polyimide resin (A1)". The polyimide resin (A1) is taken as an example, and the details will be described.

First, the repeating structural unit of the formula (1) will be described in detail below.

$R_1$ represents a divalent aliphatic group having from 6 to 22 carbon atoms containing at least one alicyclic hydrocarbon structure. The alicyclic hydrocarbon structure herein means a ring derived from an alicyclic hydrocarbon compound, and the alicyclic hydrocarbon compound may be either saturated or unsaturated and may be either monocyclic or polycyclic.

Examples of the alicyclic hydrocarbon structure include a cycloalkane ring, such as a cyclohexane ring, a cycloalkene ring, such as cyclohexene, a bicycloalkane ring, such as a norbornane ring, and a bicycloalkene ring, such as norbornene, but the alicyclic hydrocarbon structure is not limited thereto. Among these, a cycloalkane ring is preferred, a cycloalkane ring having from 4 to 7 carbon atoms is more preferred, and a cyclohexane ring is further preferred.

$R_1$ has from 6 to 22 carbon atoms, and preferably from 8 to 17 carbon atoms.

$R_1$ contains at least one alicyclic hydrocarbon structure, and preferably from 1 to 3 alicyclic hydrocarbon structures.

$R_1$ is preferably a divalent group represented by the following formula (R1-1) or (R1-2):

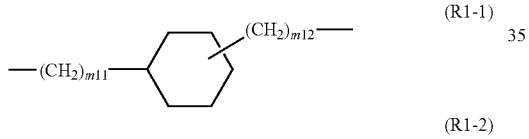
(R1-1)

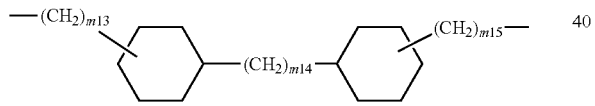
(R1-2)

wherein $m_{11}$ and $m_{12}$ each independently represent an integer of 0 to 2, preferably 0 or 1, and more preferably 1, and $m_{13}$ to $m_{15}$ each independently represent an integer of 0-2, and preferably 0 or 1.

$R_1$ is particularly preferably a divalent group represented by the following formula (R1-3):

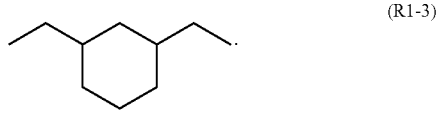
(R1-3)

In the divalent group represented by the formula (R1-3), the conformation of the two methylene groups with respect to the cyclohexane ring may be either cis or trans, and the ratio of cis and trans may be an arbitrary value.

$X_1$ represents a tetravalent aromatic group having from 6 to 22 carbon atoms. The aromatic ring in the aromatic group may be either a monocyclic ring or a condensed ring, and examples thereof include a benzene ring, a naphthalene ring, an anthracene ring, and a tetracene ring, but the aromatic ring is not limited thereto. Among these, a benzene ring and a naphthalene ring are preferred, and a benzene ring is more preferred.

$X_1$ has from 6 to 22 carbon atoms, and preferably has from 6 to 18 carbon atoms.

$X_1$ contains at least one aromatic ring, and preferably contains from 1 to 3 aromatic rings.

$X_1$ is preferably a tetravalent group represented by one of the following formulae (X-1) to (X-4):

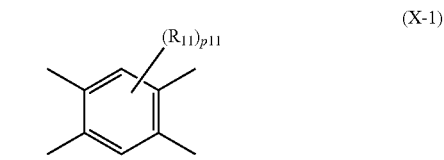
(X-1)

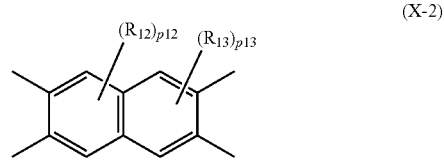
(X-2)

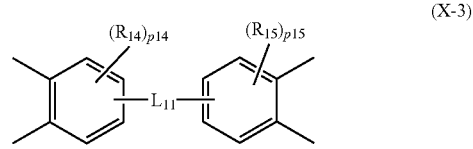
(X-3)

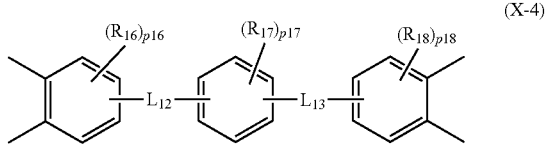
(X-4)

wherein $R_{11}$ to $R_{18}$ each independently represent an alkyl group having from 1 to 4 carbon atoms; $p_{11}$ to $p_{13}$ each independently represent an integer of 0-2, and preferably 0; $p_{14}$, $p_{15}$, $p_{16}$ and $p_{18}$ each independently represent an integer of 0-3, and preferably 0; $p_{17}$ represents an integer of 0-4, and preferably 0; and $L_{11}$ to $L_{13}$ each independently represent a single bond, an ether group, a carbonyl group or an alkylene group having from 1 to 4 carbon atoms.

$X_1$ is a tetravalent aromatic group having from 6 to 22 carbon atoms, and therefore $R_{12}$, $R_{13}$, $p_{12}$, and $p_{13}$ in the formula (X-2) are selected in such a manner that the tetravalent aromatic group represented by the formula (X-2) has from 10 to 22 carbon atoms.

Similarly, $L_{11}$, $R_{14}$, $R_{15}$, $p_{14}$, and $p_{15}$ in the formula (X-3) are selected in such a manner that the tetravalent aromatic group represented by the formula (X-3) has from 12 to 22 carbon atoms, and $L_{12}$, $L_{13}$, $R_{16}$, $R_{17}$, $R_{18}$, $p_{16}$, $p_{17}$, and $p_{18}$ in the formula (X-4) are selected in such a manner that the tetravalent aromatic group represented by the formula (X-4) has from 18 to 22 carbon atoms.

$X_1$ is particularly preferably a tetravalent group represented by the following formula (X-5) or (X-6):

(X-5)

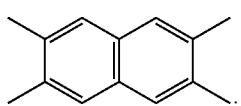
(X-6)

Next, the repeating structural unit of formula (2) will be described in detail below.

$R_2$ represents a divalent chain aliphatic group having from 5 to 16 carbon atoms, preferably from 6 to 14 carbon atoms, more preferably from 7 to 12 carbon atoms, and further preferably from 8 to 10 carbon atoms. The chain aliphatic group herein means a group derived from a chain aliphatic compound, and the chain aliphatic compound may be either saturated or unsaturated, may be in the form of either linear or branched chain, and may contain a hetero atom, such as an oxygen atom.

$R_2$ is preferably an alkylene group having from 5 to 16 carbon atoms, more preferably an alkylene group having from 6 to 14 carbon atoms, further preferably an alkylene group having from 7 to 12 carbon atoms, and particularly preferably an alkylene group having from 8 to 10 carbon atoms. The alkylene group may be either a linear alkylene group or a branched alkylene group, and is preferably a linear alkylene group.

$R_2$ preferably represents at least one selected from the group consisting of an octamethylene group and a decamethylene group, and particularly preferably represents an octamethylene group.

Another preferred embodiment of $R_2$ is a divalent chain aliphatic group having from 5 to 16 carbon atoms containing an ether group. The divalent chain aliphatic group preferably has from 6 to 14 carbon atoms, more preferably from 7 to 12 carbon atoms, and further preferably from 8 to 10 carbon atoms. Preferred examples of the group include a divalent group represented by the following formula (R2-1) or (R2-2):

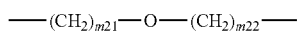 (R2-1)

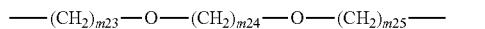 (R2-2)

wherein $m_{21}$ and $m_{22}$ each independently represent an integer of 1-15, preferably 1-13, more preferably 1-11, and further preferably 1-9; and $m_{23}$ to $m_{25}$ each independently represent an integer of 1-14, preferably 1-12, more preferably 1-10, and further preferably 1-8.

$R_2$ represents a divalent chain aliphatic group having from 5 to 16 carbon atoms (preferably from 6 to 14 carbon atoms, more preferably from 7 to 12 carbon atoms, and further preferably from 8 to 10 carbon atoms), and therefore $m_{21}$ and $m_{22}$ in the formula (R2-1) are selected so that the divalent group represented by the formula (R2-1) has from 5 to 16 carbon atoms (preferably from 6 to 14 carbon atoms, more preferably from 7 to 12 carbon atoms, and further preferably from 8 to 10 carbon atoms), i.e., $m_{21}+m_{22}$ is from 5 to 16 (preferably 6 to 14, more preferably 7 to 12, and further preferably 8 to 10).

Similarly, $m_{23}$ to $m_{25}$ in the formula (R2-2) are selected so that the divalent group represented by the formula (R2-2) has from 5 to 16 carbon atoms (preferably from 6 to 14 carbon atoms, more preferably from 7 to 12 carbon atoms, and further preferably from 8 to 10 carbon atoms), i.e., $m_{23}+m_{24}+m_{25}$ is from 5 to 16 (preferably from 6 to 14 carbon atoms, more preferably from 7 to 12 carbon atoms, and further preferably from 8 to 10 carbon atoms).

$X_2$ is defined similarly to $X_1$ in the formula (1), and preferred embodiments thereof are also the same.

The content ratio of the repeating structural unit of the formula (1) with respect to the total of the repeating structural unit of the formula (1) and the repeating structural unit of the formula (2) is 20 mol % to 70 mol %. In the case where the content ratio of the repeating structural unit of the formula (1) is in the above range, the polyimide resin may also be sufficiently crystallized in an ordinary injection molding cycle. When the content ratio is 20 mol % or more, molding processability is good, and when the content ratio is 70 mol % or less, crystallinity is good, and heat resistance is excellent.

The content ratio of the repeating structural unit of the formula (1) with respect to the total of the repeating structural unit of the formula (1) and the repeating structural unit of the formula (2) is preferably 65 mol % or less, more preferably 60 mol % or less, and further preferably 50 mol % or less from the viewpoint of exerting high crystallinity.

Among these, the content ratio of the repeating structural unit of the formula (1) with respect to the total of the repeating structural unit of the formula (1) and the repeating structural unit of the formula (2) is preferably 20 mol % or more and less than 40 mol %. When the content ratio falls within this range, the crystallinity of the polyimide resin (A1) increases, and thus, a molding material superior in heat resistance can be obtained.

The content ratio described above is preferably 25 mol % or more, more preferably 30 mol % or more, further preferably 32 mol % or more from the viewpoint of molding processability, and is further preferably 35 mol % or less from the viewpoint of exerting high crystallinity.

The content ratio of the total of the repeating structural unit of the formula (1) and the repeating structural unit of the formula (2) with respect to the total repeating structural units constituting the polyimide resin (A1) is preferably 50 to 100 mol %, more preferably 75 to 100 mol %, further preferably 80 to 100 mol %, and still further preferably 85 to 100 mol %.

The polyimide resin (A1) may further contain a repeating structural unit represented by the following formula (3). In this case, the content ratio of the repeating structural unit of formula (3) with respect to the total of the repeating structural unit of formula (1) and the repeating structural unit of formula (2) is preferably 25 mol % or less. The lower limit thereof is not particularly limited but needs to exceed 0 mol %.

The content ratio is preferably 5 mol % or more, and more preferably 10 mol % or more, from the viewpoint of enhancement of the heat resistance, and is preferably 20 mol % or less, and more preferably 15 mol % or less, from the viewpoint of maintenance of the crystallinity.

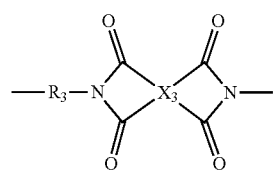 (3)

wherein $R_3$ represents a divalent group having from 6 to 22 carbon atoms containing at least one aromatic ring; and $X_3$ represents a tetravalent group having from 6 to 22 carbon atoms containing at least one aromatic ring.

$R_3$ is a divalent group having from 6 to 22 carbon atoms containing at least one aromatic ring. The aromatic ring may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$R_3$ has from 6 to 22 carbon atoms, and preferably has from 6 to 18 carbon atoms.

$R_3$ contains at least one aromatic ring, and preferably contains from 1 to 3 aromatic rings.

The aromatic ring may also be bonded to a monovalent or divalent electron-attracting group. Examples of the monovalent electron-attracting group include a nitro group, a cyano group, a p-toluenesulfonyl group, halogen, an alkyl halide group, a phenyl group, and an acyl group. Examples of the divalent electron-attracting group include alkylene halide groups such as alkylene fluoride groups (e.g., —C(CF$_3$)$_2$— and —(CF$_2$)$_p$— (wherein p is an integer of 1-10)), as well as —CO—, —SO$_2$—, —SO—, —CONH—, and —COO—.

$R_3$ is preferably a divalent group represented by the following formula (R3-1) or (R3-2);

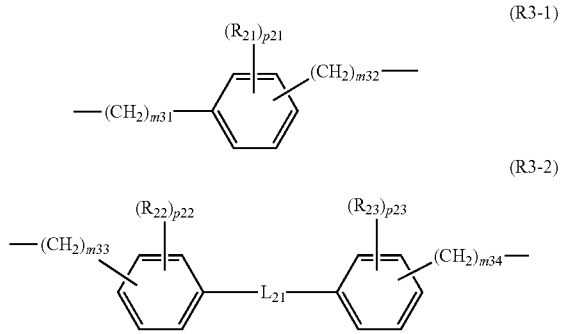

wherein $m_{31}$ and $m_{32}$ each independently represent an integer of 0-2, and preferably 0 or 1; $m_{33}$ and $m_{34}$ each independently represent an integer of 0-2, and preferably 0 or 1; $R_{21}$, $R_{22}$ and $R_{23}$ each independently represent an alkyl group having from 1 to 4 carbon atoms, an alkenyl group having from 2 to 4 carbon atoms or an alkynyl group having from 2 to 4 carbon atoms; $p_{21}$, $p_{22}$ and $p_{23}$ each represent an integer of 0-4, and preferably 0; and $L_{21}$ represents a single bond, an ether group, a carbonyl group or an alkylene group having from 1 to 4 carbon atoms.

$R_3$ is a divalent group having from 6 to 22 carbon atoms containing at least one aromatic ring, and therefore $m_{31}$, $m_{32}$, $R_{21}$ and $p_{21}$ in the formula (R3-1) are selected in such a manner that the divalent group represented by the formula (R3-1) has from 6 to 22 carbon atoms.

Similarly, $L_{21}$, $m_{33}$, $m_{34}$, $R_{22}$, $R_{23}$, $p_{22}$ and $p_{23}$ in the formula (R3-2) are selected in such a manner that the divalent group represented by the formula (R3-2) has from 12 to 22 carbon atoms.

$X_3$ is defined similarly to $X_1$ in the formula (1), and preferred embodiments thereof are also the same.

The polyimide resin (A1) may further contain a repeating structural unit represented by the following formula (4):

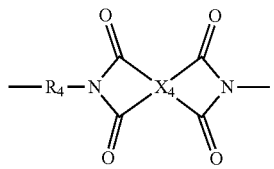

wherein $R_4$ represents a divalent group containing —SO$_2$— or —Si(R$_x$)(R$_y$)O—; R$_x$ and R$_y$ each independently represent a chain aliphatic group having from 1 to 3 carbon atoms, or a phenyl group; and $X_4$ represents a tetravalent group having from 6 to 22 carbon atoms containing at least one aromatic ring.

$X_4$ is defined similarly to $X_1$ in the formula (1), and preferred embodiments thereof are also the same.

The end structure of the polyimide resin (A1) is not particularly limited, and preferably has a chain aliphatic group having 5 to 14 carbon atoms at the end thereof.

The chain aliphatic group may be either saturated or unsaturated, and may be in the form of either linear or branched chain. When the polyimide resin (A1) contains the above particular group at the end thereof, it is possible to obtain a molded article excellent in heat aging resistance.

Example of the saturated chain aliphatic group having from 5 to 14 carbon atoms include an n-pentyl group, an n-hexyl group, an n-heptyl group, an n-octyl group, an n-nonyl group, an n-decyl group, an n-undecyl group, a lauryl group, an n-tridecyl group, an n-tetradecyl group, an isopentyl group, a neopentyl group, a 2-methylpentyl group, a 2-methylhexyl group, a 2-ethylpentyl group, a 3-ethylpentyl group, an isooctyl group, a 2-ethylhexyl group, a 3-ethylhexyl group, an isononyl group, a 2-ethyloctyl group, an isodecyl group, an isododecyl group, an isotridecyl group and an isotetradecyl group.

Example of the unsaturated chain aliphatic group having from 5 to 14 carbon atoms include a 1-pentenyl group, a 2-pentenyl group, a 1-hexenyl group, a 2-hexenyl group, a 1-heptenyl group, a 2-heptenyl group, a 1-octenyl group, a 2-octenyl group, a nonenyl group, a decenyl group, a dodecenyl group, a tridecenyl group and a tetradecenyl group.

Among these, the chain aliphatic group is preferably a saturated chain aliphatic group, and more preferably a saturated linear aliphatic group. The chain aliphatic group preferably has 6 or more carbon atoms, more preferably 7 or more carbon atoms and further preferably 8 or more carbon atoms, and preferably has 12 or less carbon atoms, more preferably 10 or less carbon atoms and further preferably 9 or less carbon atoms from the viewpoint of achievement of heat aging resistance. The chain aliphatic group may be adopted singly or in combinations of two or more.

The chain aliphatic group is particularly preferably at least one selected from the group consisting of an n-octyl group, an isooctyl group, a 2-ethylhexyl group, an n-nonyl group, an isononyl group, an n-decyl group and an isodecyl group, further preferably at least one selected from the group consisting of an n-octyl group, an isooctyl group, a 2-ethylhexyl group, an n-nonyl group, and an isononyl group, and most preferably at least one selected from the group consisting of an n-octyl group, an isooctyl group, and a 2-ethylhexyl group.

The polyimide resin (A1) preferably contains only a chain aliphatic group having from 5 to 14 carbon atoms, besides a terminal amino group and a terminal carboxy group, at the end thereof from the viewpoint of heat aging resistance.

When a group, besides the above groups, is contained at the end, the content thereof with respect to the chain aliphatic group having from 5 to 14 carbon atoms is preferably 10 mol % or less and more preferably 5 mol % or less.

The content of the chain aliphatic group having from 5 to 14 carbon atoms in the polyimide resin (A1) is preferably 0.01 mol % or more, more preferably 0.1 mol % or more, and further preferably 0.2 mol % or more based on the total 100 mol % of the total repeating structural units constituting the polyimide resin (A1) from the viewpoint of exerting excellent heat aging resistance. In order that a sufficient molecular weight is ensured and good mechanical strength are achieved, the content of the chain aliphatic group having from 5 to 14 carbon atoms in the polyimide resin (A1) is preferably 10 mol % or less, more preferably 6 mol % or less and further preferably 3.5 mol % or less based on the total 100 mol % of the total repeating structural units constituting the polyimide resin (A1).

The content of the chain aliphatic group having from 5 to 14 carbon atoms in the polyimide resin (A1) can be determined by depolymerization of the polyimide resin (A1).

The polyimide resin (A1) preferably has a melting point of 360° C. or less and a glass transition temperature of 150° C. or more. The melting point of the polyimide resin is more preferably 280° C. or more and further preferably 290° C. or more from the viewpoint of heat resistance, and is preferably 345° C. or less, more preferably 340° C. or less, and further preferably 335° C. or less from the viewpoint of exerting high molding processability. In addition, the glass transition temperature of the polyimide resin (A1) is more preferably 160° C. or more and more preferably 170° C. or more from the viewpoint of heat resistance, and is preferably 250° C. or less, more preferably 230° C. or less, and further preferably 200° C. or less from the viewpoint of exerting high molding processability.

Both the melting point and the glass transition temperature of the polyimide resin can be measured by a differential scanning calorimeter and specifically can be measured by the methods described in Examples.

In addition, in the polyimide resin (A1), the exothermic amount (hereinafter, also simply referred to as "exothermic amount of crystallization") of the crystallization exothermic peak observed in melting and then cooling of the polyimide resin at a cooling rate of 20° C./min with differential scanning calorimetric measurement is preferably 5.0 mJ/mg or more, more preferably 10.0 mJ/mg or more, and further preferably 17.0 mJ/mg or more from the viewpoint of enhancement of crystallinity, heat resistance, mechanical strength, and chemical resistance. The upper limit of the exothermic amount of crystallization is not particularly limited, and is usually 45.0 mJ/mg or less. The exothermic amount of crystallization of the polyimide resin specifically can be measured by the method described in Examples.

The logarithmic viscosity of the polyimide resin (A1) at 30° C. in a 5 mass % concentrated sulfuric acid solution is preferably 0.2 to 2.0 dL/g and more preferably 0.3 to 1.8 dL/g. When the logarithmic viscosity is 0.2 dL/g or more, a molded article formed of the polyimide molding material obtained has sufficient mechanical strength, and when the logarithmic viscosity is 2.0 dL/g or less, molding processability and handleability are good. The logarithmic viscosity μ is obtained according to the following expression by measuring the elapsed times for flowing concentrated sulfuric acid and the polyimide resin solution at 30° C. with a Cannon-Fenske viscometer.

$$\mu = \ln(t_s/t_0)/C$$

$t_0$: elapsed time for flowing concentrated sulfuric acid
$t_s$: elapsed time for flowing polyimide resin solution
C: 0.5 (g/dL)

The weight average molecular weight Mw of the polyimide resin (A1) is preferably in the range of 10,000 to 150,000, more preferably 15,000 to 100,000, further preferably 20,000 to 80,000, still further preferably 30,000 to 70,000, and still further preferably 35,000 to 65,000. When the weight average molecular weight Mw of the polyimide resin (A1) is 10,000 or more, the mechanical strength is good, and when the Mw is 150,000 or less, the molding processability is good.

The weight average molecular weight Mw of the polyimide resin (A1) can be measured by a gel permeation chromatography (GPC) method using polymethyl methacrylate (PMMA) as a standard sample.

(Method for Producing Semi-Aromatic Polyimide Resin (A))

The semi-aromatic polyimide resin (A) may be produced by reacting a tetracarboxylic acid component and a diamine component. Hereinafter, a method for producing the polyimide resin (A1) will be described as an example.

In the production of the polyimide resin (A1), the tetracarboxylic acid component contains an aromatic tetracarboxylic acid and/or a derivative thereof, and the diamine component contains an aliphatic diamine containing at least one alicyclic hydrocarbon structure and a chain aliphatic diamine.

An aromatic tetracarboxylic acid is a compound having four carboxy groups that are bonded directly to the aromatic ring, and may contain an alkyl group in the structure thereof. The aromatic tetracarboxylic acid preferably has from 6 to 26 carbon atoms. Preferred examples of the aromatic tetracarboxylic acid include pyromellitic acid, 2,3,5,6-toluenetetracarboxylic acid, 3,3',4,4'-benzophenonetetracarboxylic acid, 3,3',4,4'-biphenyltetracarboxylic acid, and 1,4,5,8-naphthalenetetracarboxylic acid. Among these, pyromellitic acid is more preferred.

Examples of the derivative of the aromatic tetracarboxylic acid include an anhydride or an alkyl ester compound of an aromatic tetracarboxylic acid. The derivative of the tetracarboxylic acid preferably has from 6 to 38 carbon atoms. Examples of the anhydride of the aromatic tetracarboxylic acid include pyromellitic monoanhydride, pyromellitic dianhydride, 2,3,5,6-toluenetetracarboxylic dianhydride, 3,3',4,4'-diphenylsulfonetetracarboxylic dianhydride, 3,3',4,4'-benzophenonetetracarboxylic dianhydride, 3,3',4,4'-biphenyltetracarboxylic dianhydride, and 1,4,5,8-naphthalenetetracarboxylic dianhydride. Examples of the alkyl ester compound of the aromatic tetracarboxylic acid include dimethyl pyromellitate, diethyl pyromellitate, dipropyl pyromellitate, diisopropyl pyromellitate, dimethyl toluenetetracarboxylate, dimethyl 3,3',4,4'-diphenylsulfonetetracarboxylate, dimethyl 3,3',4,4'-benzophenonetetracarboxylate, dimethyl 3,3',4,4'-biphenyltetracarboxylate, and dimethyl 1,4,5,8-naphthalenetetracarboxylate. The alkyl group in the alkyl ester compound of the aromatic tetracarboxylic acid preferably has from 1 to 3 carbon atoms.

The aromatic tetracarboxylic acid and/or the derivative thereof may be used as a sole compound selected from the aforementioned compounds or may be used as a combination of two or more compounds.

The aliphatic diamine containing at least one alicyclic hydrocarbon structure preferably has from 6 to 22 carbon atoms, and preferred examples thereof include 1,2-bis(aminomethyl)cyclohexane, bis(aminomethyl)cyclohexane, 1,4- bis(aminomethyl)cyclohexane, 1,2-cyclohexanediamine, 1,3-cyclohexanediamine, 1,4-cyclohexanediamine, 4,4'-diaminodicyclohexylmethane, 4,4'-methylenebis(2-methylcyclohexylamine), carvone diamine, limonene diamine, isophorone diamine, norbornane bis(aminomethyl)tricyclo [5.2.1.0$^{2,6}$]decane, 3,3' dimethyl 4,4'-diaminodicyclohexylmethane, and 4,4'-diaminodicyclohexylpropane. These compounds may be used solely or may be used as a combination of two or more compounds selected therefrom. Among these, 1,3-bis(aminomethyl)cyclohexane is preferably used. An aliphatic diamine containing an alicyclic hydrocarbon structure generally has conformational isomers, and the ratio of the cis isomer and the trans isomer is not particularly limited.

The chain aliphatic diamine may be in the form of either linear or branched chain, and has preferably from 5 to 16 carbon atoms, more preferably from 6 to 14 carbon atoms and further preferably from 7 to 12 carbon atoms. The linear moiety having from 5 to 16 carbon atoms may contain an ether bond in the course thereof. Preferred examples of the chain aliphatic diamine include 1,5-pent am ethylenediamine, 2-methylpentane-1,5-diamine, 3-methylpentane-1,5-diamine, 1,6-hexamethylenediamine, 1,7-heptamethylenediamine, 1,8-octamethylenediamine, 1,9-nonamethylenediamine, 1,10-decamethylenediamine, 1,11-undecamethylenediamine, 1,12-dodecamethylenediamine, 1,13-tridecamethylenediamine, 1,14-tetradecamethylenediamine, 1,16-hexadecamethylenediamine, and 2,2'-(ethylenedioxy)bis(ethyleneamine).

The chain aliphatic diamine may be used as a sole compound or as a mixture of plural kinds thereof. Among these, a chain aliphatic diamine having from 8 to 10 carbon atoms can be preferably used, and at least one selected from the group consisting of 1,8-octamethylenediamine and 1,10-decamethylenediamine can be particularly preferably used.

In the production of the polyimide resin (A1), the molar ratio of the charged amount of the aliphatic diamine containing at least one alicyclic hydrocarbon structure with respect to the total amount of the aliphatic diamine containing at least one alicyclic hydrocarbon structure and the chain aliphatic diamine is preferably 20 to 70 mol %. The molar ratio is preferably 25 mol % or more, more preferably 30 mol % or more, further preferably 32 mol % or more, and is preferably 60 mol % or less, more preferably 50 mol % or less, further preferably less than 40 mol, and further preferably 35 mol % or less from the viewpoint of exerting high crystallinity.

The diamine component may contain a diamine containing at least one aromatic ring. The diamine containing at least one aromatic ring preferably has from 6 to 22 carbon atoms, and examples thereof include o-xylylenediamine, m-xylylenediamine, p-xylylenediamine, 1,2-diethynylbenzenediamine, 1,3-diethynylbenzenediamine, 1,4-diethynylbenzenediamine, 1,2-diaminobenzene, 1,3-diaminobenzene, 1,4-diaminobenzene, 4,4'-diaminodiphenyl ether, 3,4'-diaminodiphenyl ether, 4,4'-diaminodiphenylmethane, α,α'-bis(4-aminophenyl)-1,4-diisopropylbenzene, α,α'-bis(3-aminophenyl)-1,4-diisopropylbenzene, 2,2-bis(4-(4-aminophenoxy)phenyl)propane, 2,6-diaminonaphthalene and 1,5-diaminonaphthalene.

The molar ratio of the charged amount of the diamine containing at least one aromatic ring with respect to the total amount of the aliphatic diamine containing at least one alicyclic hydrocarbon structure and the chain aliphatic diamine is preferably 25 mol % or less. The lower limit thereof is not particularly limited but needs to exceed 0 mol %.

The molar ratio is preferably 5 mol % or more, and more preferably 10 mol % or more, from the viewpoint of enhancement of the heat resistance, and is preferably 20 mol % or less, and more preferably 15 mol % or less, from the viewpoint of maintenance of the crystallinity.

In addition, the molar ratio is preferably 12 mol % or less, more preferably 10 mol % or less, further preferably 5 mol % or less and still more preferably 0 mol % from the viewpoint of a decrease in coloration of the polyimide resin.

In the production of the polyimide resin (A1), the charged amount ratio of the tetracarboxylic acid component and the diamine component is preferably from 0.9 to 1.1 mol of the diamine component per 1 mol of the tetracarboxylic acid component.

In the production of the polyimide resin (A1), an end capping agent is preferably mixed in addition to the tetracarboxylic acid component and the diamine component. The end capping agent is preferably at least one selected from the group consisting of a monoamine compound and a dicarboxylic acid compound. The amount of the end capping agent to be used may be any amount as long as a desired amount of an end group can be introduced into the polyimide resin (A1), and the amount is preferably 0.0001 to 0.1 mol, more preferably 0.001 to 0.06 mol, and further preferably 0.002 to 0.035 mol, per 1 mol of the tetracarboxylic acid and/or the derivative thereof.

Among these, the monoamine end capping agent is preferable as the end capping agent, and a monoamine containing a chain aliphatic group having from 5 to 14 carbon atoms is more preferable and a monoamine containing a saturated linear aliphatic group having from 5 to 14 carbon atoms is further preferable from the viewpoint of introduction of the chain aliphatic group having from 5 to 14 carbon atoms into the end of the polyimide resin (A1) for enhancement of heat aging resistance.

The end capping agent is particularly preferably at least one selected from the group consisting of n-octylamine, isooctylamine, 2-ethylhexylamine, n-nonylamine, isononylamine, n-decylamine, and isodecylamine, further preferably at least one selected from the group consisting of n-octylamine, isooctylamine, 2-ethylhexylamine, n-nonylamine, and isononylamine, and most preferably at least one selected from the group consisting of n-octylamine, isooctylamine, and 2-ethylhexylamine.

As a polymerization method for producing the semi-aromatic polyimide resin (A), a known polymerization method may be applied, and as a method for producing the polyimide resin (A1), the method described in WO2016/147996 may be employed.

<Component (B1) and Component (B2)>

The flame-retardant polyimide molding material of the present invention contains the semi-aromatic polyimide resin (A) and further contains 15 to 80 mass % of either of the following component (B1) or component (B2):
(B1) graphite
(B2) a combination of two or more selected from the group consisting of graphite, a fluorine resin, and carbon fiber.

By use of the polyimide molding material including a specific amount of either of the component (B1) or component (B2) mixed to the semi-aromatic polyimide resin (A), a molded article having high flame resistance and also having excellent mechanical properties can be provided due to the mechanism of action mentioned above.

(Component (B1))

The graphite used as the component (B1) may be either natural graphite or artificial graphite, and examples thereof include natural graphite such as flake graphite, vein graphite (also referred to as lump graphite), amorphous graphite, and spherical graphite, expandable graphite obtained by chemically treating flake graphite with concentrated sulfuric acid or the like and then heating the graphite, expanded graphite obtained by heating expandable graphite at a high temperature, and artificial graphite.

Among these, the graphite used as the component (B1) is preferably natural graphite and more preferably at least one selected from the group consisting of flake graphite and vein graphite. The flame-retardant polyimide molding material of the present invention may exhibit high flame resistance due to the mechanism of action mentioned above even without use of specially-treated graphite such as expandable graphite and expanded graphite.

The average particle size (D50) of the graphite is not particularly limited and is preferably more than 1 μm, more preferably 2 μm or more, further preferably 3 μm or more, and still further preferably 5 μm or more, from the viewpoint of achievement of high flame resistance and from the viewpoint of handleability. In addition, from the viewpoint of dispersibility in the semi-aromatic polyimide resin (A), the average particle size (D50) of the graphite is preferably 50 μm or less, more preferably 40 μm or less, further preferably 30 μm or less, and still further preferably 20 μm or less.

The average particle size (D50) can be measured with a laser diffracted light scattering particle size distribution analyzer.

The graphite as the component (B1) may be surface-treated with a silane coupling agent, a titanate-based coupling agent, an aluminate-based coupling agent or the like as long as the effects of the present invention are not impaired.

Commercially available products may be used as the graphite of the component (B1). Examples of commercially available graphite include flake graphite: "BF-3AK", "BF-15AK", "FBF", "CBR", "CPB-6S", "CPB-3", "96L", "96L-3", and "K-3", vein graphite: "BF-10AK" and "HLP", and spherical graphite: "WF-15C" produced by Chuetsu Graphite Works Co., Ltd.; and vein graphite powder: CP series, CB series, F # series, amorphous graphite powder: "Blue P", "AP", and "P #1", artificial graphite powder: PAG series and HAG series, spheroidized graphite powder: CGC series, CGB series, flake graphite powder: "GR-15", "CMX-40", "UP-20", "UP-35N", "UP-15N", and "UP-5N", and additionally, ACP series, ACB series, and SP series, produced by Nippon Kokuen Group.

(Component (B2))

The component (B2) used in the present invention is a combination of two or more selected from the group consisting of graphite, a fluorine resin, and carbon fiber. When two or more among these are combined, a molded article having high flame resistance can be obtained due to the mechanism of action mentioned above.

[Graphite]

The graphite used in the component (B2) and preferred forms thereof are as described in the component (B1).

[Fluorine Resin]

Examples of the fluorine resin used in the component (B2) include polytetrafluoroethylene (PTFE), polychlorotrifluoroethylene (PCTFE), polyvinylidene fluoride (PVDF), a copolymer of tetrafluoroethylene and hexafluoropropylene (FEP), a copolymer of tetrafluoroethylene and perfluoroalkyl vinyl ether (PFA), a copolymer of tetrafluoroethylene and ethylene (ETFE), and a copolymer of tetrafluoroethylene and perfluoroalkoxy ethylene, and these can be used singly or in combinations of two or more thereof. Particularly, polytetrafluoroethylene is preferred from the viewpoint of an excellent anti-dripping effect on resin combustion and achievement of the high flame resistance.

The fluorine resin is preferably in a powder form from the viewpoint of achievement of high flame resistance and from the viewpoint of handleability. The average particle size (D50) of the fluorine resin powder is not particularly limited, and is preferably 1 μm or more, more preferably 2 μm or more, further preferably 3 μm or more, and still further preferably 5 μm or more, from the viewpoint of achievement of high flame resistance and from the viewpoint of handleability. In addition, from the viewpoint of dispersibility in the semi-aromatic polyimide resin (A), the average particle size (D50) is preferably 50 μm or less, more preferably 40 μm or less, further preferably 30 μm or less, and still further preferably 20 μm or less.

The average particle size (D50) can be measured with a laser diffracted light scattering particle size distribution analyzer.

Also in polytetrafluoroethylene, from the viewpoint of achievement of high flame resistance, it is more preferred to use polytetrafluoroethylene having a weight loss percentage after heating from 100° C. to 450° C. at a heating rate of 10° C./min in an air atmosphere (hereinafter also referred to as "weight loss percentage after heating at 450° C. in an air atmosphere" or simply "weight loss percentage") of 1% or less, measured with thermogravimetry differential thermal analyzer. The weight loss percentage is more preferably 0.8% or less, further preferably 0.5% or less, and still further preferably 0.3% or less, from the viewpoint of achievement of high flame resistance.

The weight loss percentage can be calculated using a differential scanning calorimeter from the difference in a sample weight at temperatures of 100° C. and 450° C. when a sample (fluororesin) is heated to about 450° C. at a heating rate of 10° C./min in an air atmosphere.

Herein, the polytetrafluoroethylene having no change or an increase in the weight after heating at 450° C. in an air atmosphere is also included in the range of "weight loss percentage of 1% or less". The weight loss percentage of polytetrafluoroethylene having an increase in the weight after heating at 450° C. in an air atmosphere is denoted with a minus sign.

Commercially available product may be used as the fluorine resin. Among commercially available fluorine resins, examples of polytetrafluoroethylene include "KT-300M", "KT-400M", "KT-600M" (weight loss percentage: −0.68% (increased weight)), "KTL-450A", "KTL-450", "KTL-610" (weight loss percentage: 1.53%), "KTL-610A" (weight loss percentage: 0.63%), "KTL-620", "KTL-20N", "KTL-10N", "KTL-10S", "KTL-9N", "KTL-9S", "KTL-8N", "KTL-4N", "KTL-2N", "KTL-1N", "KTL-8F", "KTL-8FH", and "KTL-500F" produced by KITAMURA LIMITED, 3M Dyneon PTFE Micropowders "TF9201Z", "TF9205", and "TF9207" produced by 3M Japan Limited, and "POLYFLON PTFE-M" series, "POLYFLON PTFE-F" series, and "POLYFLON PTFE LUBRON" series produced by DAIKIN INDUSTRIES, Ltd.

[Carbon Fiber]

Examples of the carbon fiber used in the component (B2) include polyacrylonitrile-based carbon fiber and pitch-based carbon fiber.

The form of the carbon fiber is not particularly limited. Either of continuous fiber and short fiber can be used depending on the form of the flame-retardant polyimide molding material and molded article to be obtained, and both the fibers may be used in combination.

The form of the flame-retardant polyimide molding material will be described below. When the flame-retardant polyimide molding material is in the form of pellets, the carbon fiber is preferably short fiber having an average fiber length of less than 10 mm, from the viewpoint of extrusion moldability and the like. The flame-retardant polyimide molding material may also be in the form of prepreg obtained by impregnating the carbon fiber with a mixture including the semi-aromatic polyimide resin (A) and a fluorine resin or graphite as the component (B2). The carbon fiber in this case is preferably continuous fiber.

When the carbon fiber is short fiber, the average fiber length is preferably less than 10 mm, more preferably 0.5 to 8 mm, and further preferably 2 to 8 mm.

When the carbon fiber is continuous fiber, examples of various forms include monofilaments or multifilaments simply arranged in one direction or intercrossed, a fabric, such as a knit fabric, a non-woven fabric, or a mat. Among these, the form of a monofilament, a fabric, a non-woven fabric, or a mat is preferred, and the form of a fabric is more preferred.

When the carbon fiber is continuous fiber, the fineness is preferably 20 to 4,500 tex and more preferably 50 to 4,000 tex. When the fineness falls within this range, impregnation of the semi-aromatic polyimide resin (A) is easy, and the resulting molded article is excellent in modulus of elasticity and strength. The fineness may be determined in terms of weight per 1,000 m by determining the weight of the continuous fiber having an arbitrary length.

The average fiber diameter of the carbon fiber is preferably 1 to 100 μm, more preferably 3 to 50 μm, and further preferably 4 to 20 μm. When the average fiber diameter is in the range, processing is easy and the resulting molded article is excellent in modulus of elasticity and strength.

The average fiber length of the carbon fiber (short fiber) and the average fiber diameter of the carbon fiber can be determined as follows: the carbon fiber is observed under a scanning electron microscope (SEM) or the like, 50 or more fibers are selected at random, their lengths or diameters are measured, and a number average fiber length or fiber diameter is calculated.

The carbon fiber usually has filaments in the range of 500 to 100,000, preferably 5,000 to 80,000, and more preferably 10,000 to 70,000.

The carbon fiber is preferably surface-treated with a surface treatment agent in order to enhance wettability and interface adherence with the semi-aromatic polyimide resin (A). The concept of the surface treatment agent also includes a bundling agent and a sizing agent.

Examples of the surface treatment agent include an epoxy-based material, a urethane-based material, an acryl-based material, a polyamide-based material, a polyester-based material, a vinyl ester-based material, a polyolefin-based material, and a polyether-based material. These can be used singly or in combinations of two or more thereof. An epoxy-based material is preferred as the surface treatment agent from the viewpoint that the higher mechanical properties and high flame resistance are both achieved.

The amount of the carbon fiber to be treated by the surface treatment agent can be appropriately selected in accordance with the type of the surface treatment agent, the form of the carbon fiber, and the like. For example, when short fiber is used as the carbon fiber, short fiber surface-treated by a sizing agent is preferred from the viewpoint that the dispersibility in the semi-aromatic polyimide resin (A) is enhanced and higher flame resistance is achieved. The amount of the sizing agent attached is preferably in the range of 1.5 to 10 mass % and more preferably in the range of 2 to 5 mass %.

Commercially available carbon fiber may be used as the carbon fiber. Examples of commercially available carbon fiber (short fiber) include Chopped Fiber "CFUW", "CFEPP", "CFEPU", "CFA4", "FX1", "EX1", "BF-WS", and "CF-N" series, produced by Nippon Polymer Sangyo Co., Ltd.; and "PYROFIL Chopped Fiber" series produced by Mitsubishi Chemical Corporation.

The component (B2) only has to be a combination of two or more selected from the group consisting of graphite, fluorine resins, and carbon fiber, and only has to be any of combinations of (1) graphite and a fluorine resin, (2) graphite and carbon fiber, (3) a fluorine resin and carbon fiber, and (4) graphite, a fluorine resin, and carbon fiber. Among these, any of (1), (2), and (4) is preferred, and (2) or (4) is more preferred, from the viewpoint of achievement of high flame resistance.

The proportion of the graphite, fluorine resin, and carbon fiber contained in the component (B2) is not particularly limited. From the viewpoint of exertion of the properties derived from the components (graphite, fluorine resin, and carbon fiber) in the component (B2), the content of each component in the component (B2) is preferably at least 1 mass % or more, more preferably 5 mass % or more, further preferably 10 mass % or more, still further preferably 20 mass % or more, and still further preferably 30 mass % or more, when the total amount of the component (B2) is taken as 100 mass %.

For example, when the component (B2) is a combination of two selected from the group consisting of graphite, a fluorine resin, and carbon fiber ((1) to (3)), the mass ratio of the two components is preferably 1/99 to 99/1, more preferably 5/95 to 95/5, further preferably 10/90 to 90/10, still further preferably 20/80 to 80/20, still further preferably 30/70 to 70/30, and still further preferably 40/60 to 60/40.

When the component (B2) is a combination of three: graphite, a fluorine resin, and carbon fiber ((4)), the content of two components of the three only has to be preferably 1 mass % or more, more preferably 5 mass % or more, further preferably 10 mass % or more, still further preferably 20 mass % or more, and still further preferably 30 mass % or more, and the content of the other one component only has to be preferably 98 mass % or less, more preferably 90 mass % or less, further preferably 80 mass % or less, still further preferably 60 mass % or less, and still further preferably 40 mass % or less, in the component (B2).

The content of either of the component (B1) or the component (B2) in the flame-retardant polyimide molding material is 15 to 80 mass %, preferably 20 to 70 mass %, more preferably 25 to 65 mass %, and further preferably 30 to 60 mass %. When the content of the component (B1) or the component (B2) in the flame-retardant polyimide molding material is 15 mass % or more, a molded article having high flame resistance, good mechanical properties, and good thermal properties can be obtained. When the content is 80 mass % or less, the molding processability is good.

<Additives and the Like>

In the flame-retardant polyimide molding material of the present invention, additives may be mixed as required, such as a delusterant, a nucleating agent, a plasticizer, an anti-static agent, an anti-coloring agent, an anti-gelling agent, a colorant, a slidability-improving agent, an antioxidant, a conducting agent, a resin-modifying agent, and a filler other than graphite and carbon fiber. The filler other than graphite and carbon fiber is preferably talc, from the viewpoint of enhancement of the mechanical properties and heat resistance of a molded article to be obtained.

The amount of the above additive mixed is not particularly limited, and is usually 50 mass % or less, preferably 0.0001 to 30 mass %, more preferably 0.001 to 15 mass %, further preferably 0.01 to 10 mass %, and still further preferably 0.01 to 5 mass % in the flame-retardant polyimide molding material, from the viewpoint of expressing the effect of the additive without impairing the effects of the present invention.

The flame-retardant polyimide molding material of the present invention can achieve high flame resistance even if not containing an existing flame retardant, and thus, a smaller content of the flame retardant is preferred. For example, the content of the flame retardant in the flame-retardant polyimide molding material of the present invention is preferably 5 mass % or less, more preferably 2 mass % or less, further preferably 1 mass % or less, and still further preferably 0.1 mass % or less.

Examples of an existing flame retardant include a halogen-based flame retardant, a phosphorus-based flame retardant, a metal oxide-based flame retardant, a metal hydroxide-based flame retardant, a metal salt-based flame retardant, a nitrogen-based flame retardant, a silicone-based flame retardant, and a boron compound-based flame retardant.

From the viewpoint of avoidance of degradation of the appearance of the molded article, increase in outgassing under high temperatures, decrease in the mechanical strength, contamination of the equipment such as a mold, and the like due to bleed-out of the flame retardant, the flame-retardant polyimide molding material of the present invention more preferably does not contain the above flame retardant.

Another resin other than the semi-aromatic polyimide resin (A) may also be mixed in the flame-retardant polyimide resin molding material of the present invention, without impairing the characteristics of the molding material. Examples of the resin include a polyamide resin, a polyester resin, a polyimide resin other than the semi-aromatic polyimide resin (A), a polycarbonate resin, a polyetherimide resin, a polyamideimide resin, a polyphenylene ether imide resin, a polyphenylene sulfide resin, a polysulfone resin, a polyethersulfone resin, a polyallylate resin, a liquid crystal polymer, a polyether ether ketone resin, a polyether ketone resin, a polyether ketone ketone resin, a polyether ether ketone ketone resin, and a polybenzoimidazole resin. Among these, one or more flame-retardant thermoplastic resins selected from the group consisting of a polyetherimide resin, a polyphenylene sulfide resin, and a polyether ether ketone resin are preferable, and from the viewpoint of achievement of high flame resistance, a polyphenylene sulfide resin is more preferable. When a resin other than the semi-aromatic polyimide resin (A) is used in combination, the rate of such a resin to be mixed is not particularly limited, without impairing the characteristics of the flame-retardant polyimide resin molding material.

However, the total content of the component (A) and the component (B1) or the component (B2) in the flame-retardant polyimide molding material of the present invention is preferably 50 mass % or more, more preferably 70 mass % or more, further preferably 80 mass % or more, still further preferably 85 mass % or more, and still further preferably 90 mass % or more from the viewpoint of achievement of the effect of the present invention. The upper limit thereof is 100 mass %.

The flame-retardant polyimide molding material of the present invention may have any form. For example, the molding material may be pellets containing the semi-aromatic polyimide resin (A) and the component (B1) or (B2). When carbon fiber is employed in the component (B2), the molding material may be in the form of prepreg obtained by impregnating the carbon fiber with a mixture including the semi-aromatic polyimide resin (A) and a fluorine resin or graphite.

The flame-retardant polyimide molding material of the present invention is preferably pellets from the viewpoint that the flame-retardant polyimide molding material of the present invention is subjected to extrusion molding to produce a molded article.

Pellets made of the flame-retardant polyimide molding material can be obtained by, for example, adding and dry blending the semi-aromatic polyimide resin (A), the component (B1) or (B2), and various arbitrary components, if necessary, thereafter, melt-kneading the blend in an extruder, extruding the melt-kneaded product into a strand, and cutting the strand. The pellets are introduced in various kinds of molding machines and heat-molded by a method described below, thereby being easily produced into a molded article having a desired shape.

<Flame Resistance>

The flame-retardant polyimide molding material of the present invention has high flame resistance. Specifically, a molded article made of the flame-retardant polyimide molding material of the present invention has an oxygen index of preferably 27 or more, more preferably 28.5 or more, further preferably 29 or more, still further preferably 35 or more, and still further preferably 40 or more. The degree of flame resistance can be confirmed by measurement of the oxygen index, as an indicator of flame resistance. The oxygen index represents an oxygen concentration required to continue combustion. When the oxygen index exceeds 21, combustion in air is not continued under normal conditions. In general, with an oxygen index of 27 or more, high flame resistance is assumed to be exhibited.

The oxygen index can be measured by a method according to JIS K7201-2:2007 and specifically can be measured by the method described in Examples.

A 4-mm thick molded article made of the flame-retardant polyimide molding material of the present invention preferably has flame resistance corresponding to V-1 or higher in a flame resistance test according to the UL94 standard, and more preferably has flame resistance corresponding to V-0. The flame resistance specifically can be evaluated according to the method described in Examples.

[Molded Article]

The present invention provides a molded article including the flame-retardant polyimide molding material.

Since the flame-retardant polyimide molding material of the present invention has thermoplasticity derived from the semi-aromatic polyimide resin (A), the molded article of the present invention can be easily produced by heat-molding the molding material. Examples of the heat molding method include injection molding, extrusion molding, sheet extrusion molding, blow molding, heat press molding, vacuum molding, pneumatic molding, laser molding, insert molding, welding, and heat adhesion, and the polyimide molding material of the present invention may be molded by any molding method that includes a heat melting step. Among these, injection molding is preferable because molding is enabled without setting the molding temperature to an elevated temperature more than 400° C., for example.

The method for producing a molded article preferably includes the step of heat-molding the flame-retardant polyimide molding material. Examples of procedures in the case where the pellets mentioned above are used as the flame-retardant polyimide molding material include the following method.

First, the component (B1) or the component (B2) other than carbon fiber, and various arbitrary components, if necessary, are added to the semi-aromatic polyimide resin (A) and dry blended. Thereafter the resulting mixture is introduced into an extruder and molten, and carbon fiber, if used as the component (B2), is side-fed. The mixture is melt-kneaded in the extruder and extruded, thereby producing pellets. Alternatively, the semi-aromatic polyimide resin (A), the component (B1) or the component (B2) other than carbon fiber, and various arbitrary components, if necessary, are introduced into an extruder and molten, and carbon fiber, if used as the component (B2), is side-fed. The components are melt-kneaded with the semi-aromatic polyimide resin (A) in the extruder and extruded, thereby producing pellets mentioned above.

The pellets may be dried, then introduced in various kinds of molding machines and heat-molded, thereby producing a molded article having a desired shape.

Since the flame-retardant polyimide molding material of the present invention may be heat-molded by extrusion molding or the like at a temperature of 400° C. or less, the molding material is excellent in molding processability and may be easily produced into a molded product having a desired shape.

The molded article of the present invention also includes a molded article of which a portion is composed of the flame-retardant polyimide molding material. Accordingly, for example, a molded article may be produced with the flame-retardant polyimide molding material of the present invention and a thermoplastic resin other than the molding material by insert molding or the like.

The flame-retardant polyimide molding material of the present invention is excellent in molding processability as well as can be produced into a molded article having high flame resistance. The molded article can be applied, for example, in various industrial members including industrial machines such as vacuum pumps, communication devices, household electrical products, automobiles, railways, and aviation vehicles, and enclosures for electronic devices such as smartphones, tablet terminals, and personal computers, and additionally, gears, bearings, screws, nuts, packings, tubes, IC sockets for inspection, belts, covering materials for electrical wire, cover-lay films, enclosures for fishing rods and reels, stationery, carbon UD tape, and electronic cigarettes.

EXAMPLES

The present invention will be described in more detail with reference to Examples below, but the present invention is not limited thereto. Various measurements and evaluations in each Production Example, and Example were carried out in the following manners.

<Infrared Spectroscopy (IR Measurement)>

The IR measurement of the polyimide resin was performed with "JIR-WINSPEC 50", produced by JEOL, Ltd.

<Logarithmic Viscosity μ>

The polyimide resin was dried at from 190 to 200° C. for 2 hours, and then 0.100 g of the polyimide resin was dissolved in 20 mL of concentrated sulfuric acid (96%, produced by Kanto Chemical Co., Inc.) to form a polyimide resin solution, and the measurement was made at 30° C. with a Cannon-Fenske viscometer using the polyimide resin solution as a measurement sample. The logarithmic viscosity μ was obtained according to the following expression.

$$\mu = \ln(t_s/t_0)/C$$

$t_0$: elapsed time for flowing concentrated sulfuric acid
$t_s$: elapsed time for flowing polyimide resin solution
C: 0.5 g/dL <Melting Point, Glass Transition Temperature, Crystallization Temperature, and Exothermic Amount of Crystallization>

The melting point (Tm), the glass transition temperature (Tg), the crystallization temperature (Tc) and the exothermic amount of crystallization (ΔHm) of the polyimide resin were measured with a differential scanning calorimeter ("DSC-6220", produced by SII Nanotechnology, Inc.).

The polyimide resin was subjected to the following thermal history in a nitrogen atmosphere. The condition of the thermal history included the first heating (heating rate: 10° C./min), then cooling (cooling rate: 20° C./min), and then second heating (heating rate: 10° C./min).

The melting point (Tm) was determined by reading the peak top value of the endothermic peak observed in the second heating. The glass transition temperature (Tg) was determined by reading the value observed in the second heating. The crystallization temperature (Tc) was determined by reading the peak top value of the exothermic peak observed in cooling.

The exothermic amount of crystallization ΔHm (mJ/mg) was calculated from the area of the exothermic peak observed in cooling.

<Crystallization Half-Time>

The crystallization half-time of the polyimide resin was measured with a differential scanning calorimeter ("DSC-6220", produced by SII Nanotechnology, Inc.).

Under a nitrogen atmosphere, a polyimide resin was held at 420° C. for 10 minutes for melting the polyimide resin completely and then quenched at a cooling rate of 70° C./min, during which the time required from the appearance of the crystallization peak observed to the peak top thereof was calculated. In Table 1, the case where the crystallization half-time was 20 seconds or less was denoted by "<20".

<Weight Average Molecular Weight>

The weight average molecular weight (Mw) of the polyimide resin was measured with a gel permeation chromatography (GPC) measurement apparatus "Shodex GPC-101" produced by Showa Denko K.K. under the following conditions:

Column: Shodex HFIP-806M
Mobile phase solvent: HFIP containing 2 mM sodium trifluoroacetate
Column temperature: 40° C.
Flow rate of mobile phase: 1.0 mL/min
Specimen concentration: about 0.1 mass %
Detector: IR detector
Amount of injection: 100 μm
Calibration curve: standard PMMA <Weight Loss Percentage>

The weight loss percentage of the fluorine resin was calculated using a differential scanning calorimeter ("DSC-6220", produced by SII Nanotechnology, Inc.) from the difference in a sample weight at temperatures of 100° C. and 450° C. when about 10 mg of the sample was heated to about 450° C. at a heating rate of 10° C./min in an air atmosphere having a flow rate of 250 mL/min.

<Bending Strength and Flexural Modulus>

The polyimide molding material produced in each of Examples was used to prepare a molded article of 80 mm×10 mm×4 mm in thickness prescribed in ISO 316 by the method described below, and the molded article was used for measurement. The bending test was performed with Bend Graph (produced by Toyo Seiki Seisaku-Sho, Ltd.) according to ISO 178 at a temperature of 23° C. and a testing speed of 2 mm/min to measure the bending strength and the flexural modulus.

<Heat Deformation Temperature (HDT)>

The polyimide molding material produced in each of Examples was used to prepare a molded article of 80 mm×10 mm×4 mm in thickness by the method described below, and the molded article was used for measurement. A HDT tester "Auto-HDT3D-2" (produced by Toyo Seiki Seisaku-sho, Ltd.) was used to measure the heat deformation temperature under conditions including a distance between supports of 64 mm, a load of 1.80 MPa, and a heating rate of 120° C./hour.

<Oxygen Index>

The polyimide molding material produced in each of Examples was used to prepare a molded article of 80 mm×10 mm×4 mm in thickness by the method described below. The oxygen index of this molded article, as a specimen, was measured with a Candle Type Flammability Tester, Model D (produced by Toyo Seiki Seisaku-Sho, Ltd.) by a method according to JIS K7201-2:2007. A specimen having an oxygen index more than 75 was denoted by ">75".

<UL94 Flammability Test>

The polyimide molding material produced in each of Examples was used to prepare a molded article of 80 mm×10 mm×4 mm in thickness by the method described below. Using the molded article, a flammability test by a vertical flammability test method was carried out (n=5) in accordance with the UL94 standard, which is a flame resistance test standard for plastic materials published by Underwriters Laboratories Inc., and the flame resistance rank (V-0, V-1, V-2) was evaluated. Cases where the flame resistance did not reach V-2 were classified as "non-standard".

[Production Example 1] Production of Semi-Aromatic Polyimide Resin 1

500 g of 2-(2-methoxyethoxy)ethanol (produced by Nippon Nyukazai Co., Ltd.) and 218.12 g (1.00 mol) of pyromellitic dianhydride (produced by Mitsubishi Gas Chemical Company, Inc.) were introduced in a 2 L separable flask equipped with a Dean-Stark apparatus, a Liebig condenser tube, a thermocouple, and a four-paddle blade. After creation of a nitrogen flow, the mixture was agitated at 150 rpm so as to become a homogeneous suspended solution. On the other hand, 49.79 g (0.35 mol) of 1,3-bis(aminomethyl) cyclohexane (produced by Mitsubishi Gas Chemical Company, Inc., cis/trans ratio=7/3) and 93.77 g (0.65 mol) of 1,8-octamethylenediamine (produced by Kanto Chemical Co., Inc.) were dissolved in 250 g of 2-(2-methoxyethoxy) ethanol with a 500 mL beaker, thereby preparing a mixed diamine solution. This mixed diamine solution was added into the suspended solution gradually with a plunger pump. Heat was generated due to the drop addition, but the internal temperature was adjusted to be within the range of 40 to 80° C. The dropwise addition of the mixed diamine solution was carried out in a nitrogen flow state over the whole period. The number of rotations of the agitation blade was set to 250 rpm. After the completion of the dropwise addition, 130 g of 2-(2-methoxyethoxy)ethanol and 1.284 g (0.010 mol) of n-octylamine (produced by Kanto Chemical Co., Inc.) as an end capping agent were added thereto, and the mixture was further agitated. At this stage, a pale yellow polyamic acid solution was obtained. Next, the agitation speed was set to 200 rpm, and the polyamic acid solution in the 2 L separable flask was then heated to 190° C. In this heating process, the deposition of a polyimide resin powder and dehydration associated with imidization were confirmed at a solution temperature of from 120 to 140° C. The solution was kept at 190° C. for 30 minutes, then allowed to cool to room temperature, and filtered. The obtained polyimide resin powder was washed with 300 g of 2-(2-methoxyethoxy) ethanol and 300 g of methanol, filtered, and then dried at 180° C. for 10 hours with a drier, thereby providing 317 g of a powder of semi-aromatic polyimide resin 1.

The measurement of the IR spectrum of semi-aromatic polyimide resin 1 showed the characteristic absorption of an imide ring v (C=O) observed at 1768 and 1697 (cm$^{-1}$). The logarithmic viscosity was 1.30 dL/g, Tm was 323° C., Tg was 184° C., Tc was 266° C., the exothermic amount of crystallization was 21.0 mJ/mg, the crystallization half-time was 20 seconds or less, and Mw was 55,000.

The composition and evaluation results of semi-aromatic polyimide resin 1 in Production Example 1 are shown in Table 1. The values expressed in mol % of the tetracarboxylic acid component and the diamine component in Table 1 are values calculated from the charged amount of each component in production of the polyimide resin.

TABLE 1

| | | Tetracarboxylic acid component (mol % in total tetracarboxylic acid components) | Diamine component (mol % in total diamine components) | | (1)/{(1) + (2)} | Tm | Tg | Tc | Exothermic amount of crystallization | Crystallization half-time | |
|---|---|---|---|---|---|---|---|---|---|---|---|
| | | PMDA | 1,3-BAC | OMDA | (mol %)*1 | (° C.) | (° C.) | (° C.) | ΔHm (mJ/mg) | (seconds) | Mw |
| Production Example 1 | Semi-aromatic polyimide resin 1 | 100 | 35 | 65 | 35 | 323 | 184 | 266 | 21.0 | <20 | 55,000 |

*1 The content ratio of the repeating structural unit of the formula (1) (mol %) with respect to the total of the repeating structural unit of the formula (1) and the repeating structural unit of the formula (2) in semi-aromatic polyimide resin 1
Abbreviations in the Table 1 are as follows.
PMDA; pyromellitic dianhydride
1,3-BAC; 1,3-bis(aminomethyl)cyclohexane
OMDA; 1,8-octamethylenediamine Examples 1 to 9 and Comparative Examples 1 to 6 (Production and Evaluation of Polyimide Molding Material)

Examples 1 to 9 and Comparative Examples 2 to 6

The semi-aromatic polyimide resin 1 obtained in Production Example 1 and talc, graphite, and a fluorine resin each in an amount shown in Table 2 were sufficiently mixed by dry blend. Into a co-rotating twin-screw kneading extruder ("HK-25D" produced by Parker Corporation, screw diameter: 25 mm (0, L/D=41), the resulting mixed powder was loaded at a feed rate of 3.5 kg/hour via the hopper. On the other hand, in Examples 5 and 7 to 9 and Comparative Example 4, an amount of carbon fiber at a proportion shown in Table 2 was loaded via the side feeder. The kneaded product was extruded at a barrel temperature of 330 to 335° C. and a screw rotation speed of 150 rpm. A strand extruded from the extruder was cooled in air and then pelletized with a pelletizer ("Fan Cutter FC-Mini-4/N", produced by Hoshi Plastic Co., Ltd.). The resulting pellets were dried at 150° C. for 12 hours and then used in injection molding.

The injection molding was performed at a barrel temperature of 350° C., a mold temperature of 200° C., and a molding cycle of 50 seconds with an injection molding machine ("ROBOSHOT α-S30iA", produced by FANUC CORPORATION), thereby preparing a molded article of a predetermined shape for use in various evaluations.

The obtained molded article was used to perform various evaluations mentioned above. The results are shown in Table 2.

TABLE 2

| | | | | Example | | | | | | | | |
|---|---|---|---|---|---|---|---|---|---|---|---|---|
| | | | | 1 | 2 | 3 | 4 | 5 | 6 | 7 | 8 | 9 |
| Amount to be mixed (mass %) | Semi-aromatic polyimide resin 1 | | | 79.2 | 69.3 | 59.4 | 49.5 | 79.2 | 69.1 | 69.3 | 69.2 | 49.5 |
| | Graphite | | | 20.0 | 30.0 | 40.0 | 50.0 | 10.0 | 10.0 | 10.0 | 10.0 | 40.0 |
| | Fluorine resin | | | | | | | | 20.0 | | 10.0 | |
| | Carbon fiber | | | | | | | 10.0 | | 20.0 | 10.0 | 10.0 |
| | Talc | | | 0.8 | 0.7 | 0.6 | 0.5 | 0.8 | 0.9 | 0.7 | 0.8 | 0.5 |
| Evaluation results | Mechanical physical properties | Bending strength | MPa | 112 | 108 | 127 | 102 | 188 | 88 | 211 | 163 | 133 |
| | | Flexural modulus | GPa | 7.5 | 10.7 | 15.8 | 20.0 | 12.9 | 4.6 | 18.1 | 11.2 | 25.4 |
| | HDT | High load (1.80 MPa) | °C. | 194 | 224 | 247 | 260 | 270 | 183 | 283 | 255 | 284 |
| | Flame resistance | Oxygen index | — | 33.5 | 41.0 | 55.0 | >75 | 30.0 | 28.5 | 34.0 | 29.0 | 65.0 |
| | | UL94 flame resistance test (thickness: 4 mm) | — | — | V-0 | V-0 | V-0 | — | — | V-1 | V-0 | V-0 |

| | | | | Comparative Example | | | | | |
|---|---|---|---|---|---|---|---|---|---|
| | | | | 1 | 2 | 3 | 4 | 5 | 6 |
| Amount to be mixed (mass %) | Semi-aromatic polyimide resin 1 | | | 100.0 | 89.1 | 89.0 | 89.1 | 79.0 | 69.0 |
| | Graphite | | | | 10.0 | | | | |
| | Fluorine resin | | | | | 10.0 | | 20.0 | 30.0 |
| | Carbon fiber | | | | | | 10.0 | | |
| | Talc | | | | 0.9 | 1.0 | 0.9 | 1.0 | 1.0 |
| Evaluation results | Mechanical physical properties | Bending strength | MPa | 120 | 136 | 110 | 237 | 100 | 88 |
| | | Flexural modulus | GPa | 2.6 | 4.9 | 2.6 | 8.3 | 2.5 | 2.4 |
| | HDT | High load (1.80 MPa) | °C. | 170 | 185 | 176 | 259 | 174 | 169 |
| | Flame resistance | Oxygen index | — | 23.6 | 28.0 | 23.0 | 25.5 | 23.5 | 24.0 |
| | | UL94 flame resistance test (thickness: 4 mm) | — | V-2 | Non-standard | Non-standard | Non-standard | Non-standard | Non-standard |

* "—" represents no measurement.

from the extruder was cooled in air and then pelletized with a pelletizer ("Fan Cutter FC-Mini-4/N", produced by Hoshi Plastic Co., Ltd.). The resulting pellets were dried at 150° C. for 12 hours and then used in injection molding.

The injection molding was performed at a barrel temperature of 385° C., a mold temperature of 200° C., and a molding cycle of 60 seconds with an injection molding machine ("ROBOSHOT α-S30iA", produced by FANUC CORPORATION), thereby preparing a molded article of a predetermined shape for use in various evaluations.

The obtained molded article was used to perform various evaluations mentioned above. The results are shown in Table 2.

Comparative Example 1

The semi-aromatic polyimide resin 1 obtained in Production Example 1 was extruded at a barrel temperature of 350°

The details of each component shown in Table 2 are as follows.
<Semi-Aromatic Polyimide Resin 1>
Semi-aromatic polyimide resin 1 obtained in Production Example 1, Mw: 55,000
<Graphite>
"BF-10AK" produced by Chuetsu Graphite Works Co., Ltd., vein graphite, average particle size (D50): 10 μm
<Fluorine Resin>
"KT-600M" produced by KITAMURA LIMITED, polytetrafluoroethylene powder, average particle size (D50): 14 μm, weight loss percentage after heating at 450° C. in an air atmosphere: −0.68% (increased weight)
<Carbon Fiber>
"EX1-MC" produced by Nippon Polymer Sangyo Co., Ltd., sizing agent: epoxy-based, amount of sizing agent: 3.0 mass %, average fiber length: 6 mm, average fiber diameter: 7 µm, number of filaments: 12,000
<Talc>
"NANO ACE D-800", produced by Nippon Talc Co., Ltd., average particle size (D50): 0.8 µm As shown in Table 2, the molded articles made of the polyimide molding material of each of Examples 1 to 4, which include the semi-aromatic polyimide resin (A) and the component (B1), and Examples 5 to 9, which include the semi-aromatic polyimide resin (A) and the component (B2), were excellent in flame resistance and had good mechanical physical properties and thermal properties, in comparison with the molded articles obtained in Comparative Examples 1 to 6.

When polytetrafluoroethylene, which is a fluorine resin and a material having a high oxygen index, is mixed singly to the component (A), the degree of the oxygen index of the polyimide molding material is insufficiently enhanced (Comparative Examples 3, 5, and 6). When the fluorine resin is used in combination with graphite or carbon fiber, it can be seen that the oxygen index markedly increases and furthermore, good mechanical physical properties are obtained (Examples 6 and 8).

INDUSTRIAL APPLICABILITY

The flame-retardant polyimide molding material of the present invention is excellent in molding processability as well as can be produced into a molded article having high flame resistance. The molded article can be applied, for example, in various industrial members including industrial machines such as vacuum pumps, communication devices, household electrical products, automobiles, railways, and aviation vehicles, and enclosures for electronic devices such as smartphones, tablet terminals, and personal computers, and additionally, gears, bearings, screws, nuts, packings, tubes, IC sockets for inspection, belts, covering materials for electrical wire, cover-lay films, enclosures for fishing rods and reels, stationery, carbon UD tape, and electronic cigarettes.

The invention claimed is:

1. A flame-retardant polyimide molding material, comprising:
   a semi-aromatic polyimide resin (A); and
   15 to 80 mass % of component (B2) which is at least one selected from the group consisting of a mixture of graphite and carbon fiber having a mass b1824ratio of 80:20 to 20:80, and a mixture of graphite, a fluorine resin, and carbon fiber where a content of two of the graphite, the fluorine resin, and the carbon fiber is each 30 mass % or more and a content of a third of the graphite, the fluorine resin, and the carbon fiber is 40 mass % or less, each based on a total mass of the mixture,
   wherein the semi-aromatic polyimide resin (A) is a polyimide resin (A1) comprising
   a repeating structural unit of formula (1) and
   a repeating structural unit of formula (2),

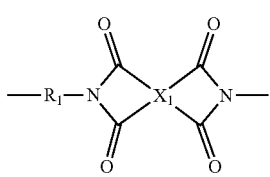

(1)

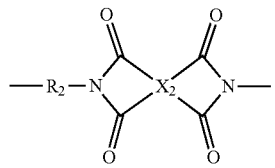

(2)

where $R_1$ is a divalent aliphatic group having from 6 to 22 carbon atoms comprising at least one alicyclic hydrocarbon structure,
$R_2$ is a divalent chain aliphatic group having from 5 to 16 carbon atoms,
$X_1$ and $X_2$ are each independently a tetravalent aromatic group having from 6 to 22 carbon atoms, and the polyimide resin (A1) includes 20-70 mol % of the repeating structural unit of the formula (1) with respect to a total of the repeating structural unit of the formula (1) and the repeating structural unit of the formula (2).

2. The flame-retardant polyimide molding material according to claim 1, wherein the semi-aromatic polyimide resin (A) and/or the component (B2) are included at a total content of 50 mass % or more based on a total mass of flame retardant polyimide molding material.

3. The flame-retardant polyimide molding material according to claim 1, further comprising:
   a flame retardant at a content of 5 mass % or less based on a total mass of flame-retardant polyimide molding material.

4. The flame-retardant polyimide molding material according to claim 1, which has an oxygen index of 28.5 or more.

5. A molded article, comprising:
   the flame-retardant polyimide molding material of claim 1.

6. The flame-retardant polyimide molding material according to claim 1, wherein
   the component (B2) is a mixture of graphite and carbon fiber having a mass ratio of 80:20 to 20:80; and
   the semi-aromatic polyimide resin (A) and the component (B2) are included at a total content of 50 mass % or more based on a total mass of flame-regardant polyimide molding material.

7. The flame-retardant polyimide molding material according to claim 1, wherein the component (B2) is a mixture of graphite and carbon fiber having a mass ratio of 80:20 to 20:80.

8. The flame-retardant polyimide molding material according to claim 7, further comprising:
   a flame retardant at a content of 5 mass % or less based on a total mass of flame-retardant polyimide molding material.

9. The flame-retardant polyimide molding material according to claim 8, which has an oxygen index of 28.5 or more.

10. The flame-retardant polyimide molding material according to claim 1, wherein the component (B2) is a mixture of graphite, a fluorine resin, and carbon fiber where a content of two of the graphite, the fluorine resin, and the carbon fiber is each 30 mass % or more and a content of a third of the graphite, the fluorine resin, and the carbon fiber is 40 mass % or less, each based on a total mass of the mixture.

11. The flame-retardant polyimide molding material according to claim 10, further comprising:

a flame retardant at a content of 5 mass % or less based on a total mass of flame-retardant polyimide molding material.

12. The flame-retardant polyimide molding material according to claim 11, which has an oxygen index of 28.5 or more.

13. The flame-retardant polyimide molding material according to claim 1, which has a bending strength of 133 to 211 MPa and a flexural modulus of 11.2 to 25.4 GPa.

* * * * *